United States Patent [19]

Watanabe et al.

[11] Patent Number: 5,003,468

[45] Date of Patent: Mar. 26, 1991

[54] GUEST MACHINE EXECUTION CONTROL SYSTEM FOR VIRUTAL MACHINE SYSTEM

[75] Inventors: Masaya Watanabe; Fujio Wakui; Shuichi Abe, all of Hadano, Japan

[73] Assignees: Hitachi, Ltd., Tokyo; Hitachi Computer Engineering Co., Kanagawa, both of Japan

[21] Appl. No.: 190,648

[22] Filed: May 5, 1988

[30] Foreign Application Priority Data

May 11, 1987 [JP] Japan .................................. 62-114243

[51] Int. Cl.$^5$ ..................... G06F 09/44; G06F 09/445
[52] U.S. Cl. .................................................. 364/200
[58] Field of Search ... 364/200 MS File, 900 MS File

[56] References Cited

U.S. PATENT DOCUMENTS

| 4,400,769 | 8/1983 | Kaneda et al. | 364/200 |
|---|---|---|---|
| 4,456,954 | 6/1984 | Bullions III et al. | 364/200 |
| 4,779,188 | 10/1988 | Gum et al. | 364/200 |
| 4,816,991 | 3/1989 | Watanabe et al. | 364/200 |

Primary Examiner—Eddie P. Chan
Attorney, Agent, or Firm—Antonelli, Terry, Stout & Kraus

[57] ABSTRACT

Mask data in a PSW are latched and sent from a host to a guest are subjected to a logical AND operation with latched data taken from an intervention request field of a state descriptor of the guest machine. The resultant logical product is used for setting the PSW of the guest machine and activating an interception to the host. The overhead of an execution controller managing the state transition between guest-host machines is reduced.

8 Claims, 5 Drawing Sheets

GUEST MACHINE EXECUTION CONTROL SYSTEM FOR VIRUTAL MACHINE SYSTEM

CROSS REFERENCE TO RELATED APPLICATION

The present application is associated with U.S. Patent application Ser. No. 26,064 entitled VIRTUAL MACHINE SYSTEM filed by two among the present inventors on Mar. 19, 1987 now U.S. Pat. No. 4,816,991.

BACKGROUND OF THE INVENTION

The present invention relates to a virtual machine system and more particularly to a guest machine execution control system suitable for processing guest instructions at high speed.

As shown in U.S. Pat. No. 4,456,954, in the virtual machine system, operation of a virtual machine (hereinafter called VM) starts only after a start interpretive execution instruction (hereinafter called SIE instruction) for indicating execution start of the virtual machine has been executed.

FIG. 2 of the accompanying drawings shows the format of an SIE instruction which designates as operands a state descriptor (hereinafter called SD) on a main storage (hereinafter called MS), by using a base register number field B2 and a displacement field D2. An instruction unit of a central processing unit (hereinafter called CPU) decodes the SIE instruction to read out the respective SD fields from the MS and place the fields in hardware resources of the CPU, thereby permitting the CPU to operate as a guest VM. As the hardware resources in which the SD fields can be placed, there may be mentioned a guest mode latch, a program status word (PSW) register, a control register (CR), a general register (GR), a prefix register, an MS extent register and the like. Thus, the SD describeds the architecture of the guest VM as viewed from the side of a guest instruction. On the other hand, the state of the host is reserved in the CPU.

The guest VM started in response to the SIE instruction continues to emulate a guest program until interruption or interception for control transfer to the VMCP takes place. With the term "interruption", it is intended to mean interruptions such as input/output interruption and external interruption which require the processing by the host. The interception may occur, for example, when an instruction requiring the processing by the host has to be executed. Whether the interception is to be issued or not for some of privileged instructions can be designated by an interception mask field contained in the SD. Upon occurrence of the interruption or interception, operation of the guest VM comes to an end, whereupon the CPU is set to the host mode to be restored to the state ready for executing the SIE instruction.

In a virtual machine system, all or part of the I/O processings by the guest are simulated with the VMCP. Namely, when an I/O activation instruction is designated in a guest program, the guest VM stops its operation and an interception is noticed to the VMCP which then simulates the I/O activation instruction of the guest program to start the I/O processings for a real I/O device. A corresponding I/O interruption instruction is acknowledged by the VMCP according to an I/O mask of the host. The VMCP suspends or holds the guest I/O interruption until the guest I/O mask turns on, whereupon the guest I/O interruption is enabled. Similar processings are performed for some of external interruptions from the guest. In the following description, a term "intervention request" is used for indicating that acknowledgement of a guest interruption by the VMCP has been noticed to the guest and the guest interruption is suspended by the VMCP until the mask of the guest turns on.

In the virtual machine system, an intervention request field is provided in the SD as shown in FIG. 2 for the VMCP to suspend the guest interruption. The intervention request field is constructed of bits each being related to a main cause of an interruption to be suspended. Particularly, it is constructed of an I/O intervention request bit related to an I/O interruption, an external intervention request bit related to an external interruption and the like.

A flow of processing the I/O interruption to be suspended by the VMCP is shown in FIG. 3. At step 28, the VMCP acknowledges an I/O interruption request from a particular guest VM (indicated by guest 1). At step 29, the VMCP sets the I/O intervention request bit, in the intervention request field of the SD, at "1" to suspend the acknowledged guest I/O interruption request. Thereafter, the VMCP continues performing the processings and issues the SIE instruction to activate the guest 1. If the I/O intervention request bit of the SD is "1", the guest 1 stops its operation when the I/O mask (indicated by GPSW(IO)) of the guest PSW becomes "1" and notifies the VMCP of an interception.

In more particular, at step 31 the guest 1 starts executing guest instructions since the GPSW (IO) is 0 in the example shown in FIG. 3. Step 32 indicates that the GPSW (IO) changes from "0" to "1" after execution of a Load PSW (LPSW) instruction by which data read from the main storage at the location designated by the operands of the instruction are loaded in the current PSW register, a Store-Then-OR-System-Mask (STOSM) instruction by which the current system mask is stored in the main storage at the designated location and then data of the instruction are OR-ed with the system mask, a Set-System-Mask (SSM) instruction by which data read from the main storage at the location designated by the operands are set in the system mask, or other instructions associated with the system mask. The condition of interception is satisfied when such a change occurs, whereupon the guest 1 terminates executing the guest instruction and notifies the VMCP of the interception (step 33). The VMCP simulates the I/O interruption of the guest 1 (step 34) to again activate the guest 1 (step 35). The guest 1 resumes the processings after the interruption by the I/O interruption handler.

The VMCP suspends the guest external interruption in the similar manner as above, so that the following description is directed only to the guest I/O interruption.

As seen from step 32 of FIG. 3, if an instruction changing the system mask of the guest VM is executed and the GPSW (IO) changes from "0" to "1", it becomes necessary to judge if operation of the guest VM is to be terminated upon reception of an interception or otherwise to be continued, based on the presence or absence of the I/O intervention request.

FIG. 4 shows the sequence of processing an LPSW instruction. The process sequence will be described by using an LPSW instruction by way of example, the same sequence being applied to other instructions changing the system mask. It is first checked at step 14 if there is an access exception or a designation exception. If a cause of exception is present, an interruption process is performed at step 23. If not present, a flag is initialized (step 15). If the GPSW (IO) to be set newly is "1" (step 16), the intervention request field is read from the SD of the guest VM now in concern (step 17). If the I/O request bit of the read-out intervention request field is "1" (step 18), the flag is set at "1" (step 19). The flag "1" indicates that the condition of issuance of an interception in response to the I/O intervention request has been met. Next, the PSW register is set (step 20). If both the flag and the GPSW (IO) are "1", then an interception process is performed (steps 21, 22). If not, processing the LPSW instruction is terminated.

The occurrence frequency of I/O intervention requests is generally so small that the performance to be achieved by the system takes into consideration the case where an LPSW instruction is executed normally over a process main path including steps 14, 15, 16, 20, 21 and 37 or a process main path including steps 14, 15, 16, 17, 18, 20, 21 and 37. Steps for reading an intervention request field and checking an I/O intervention request bit are provided in addition to those by the host LPSW instruction. Such additional steps involve the overhead of processing a guest instruction.

According to the technique described as above, each time an instruction which changes the guest system mask is executed, it becomes necessary to check the presence or absence of an I/O intervention request and check if the condition of an interception by the I/O intervention request has been met, by referring to the SD on the main storage (or a temporary copy of the SD on the local storage of the CPU). Thus, it poses the problem of substantial decline of the performance of processing an instruction which changes the guest system mask.

SUMMARY OF THE INVENTION

It is an object of the present invention to provide a guest machine execution control system in a virtual machine system capable of processing a guest instruction which changes the guest system mask, at a speed substantially equal to that of processing a host instruction.

It is another object of the invention to provide a circuit for checking an intervention request set in the VM state descriptor by the VMCP during execution of a guest machine in a virtual machine system.

The above objects are achieved by a circuit comprising a latch group (intervention request pending latch) provided in the CPU for storing the value of intervention request field of the SD of a guest VM under execution, wherein the intervention request pending latch is set when an SIE instruction is executed and renewed at a proper period, and whereby if the intervention request latch is "1" during execution of the guest VM and the bit corresponding to the system mask of the guest VM is on, an interruption is issued to the microprogram of the CPU. After the interruption, the microprogram execution controller causes the execution of the guest VM to stop upon issuance of an interception.

The condition of the intervention request at the VMCP executing a guest VM and the guest system mask is checked in a hardware manner. Therefore, the condition needs not be checked by the microprogram when an instruction which changes the guest system mask is to be executed, to thereby improve the performance of processing an instruction which changes the guest system mask.

DESCRIPTION OF THE PREFERRED EMBODIMENT

The embodiment of this invention will now be described with reference to the accompanying drawings.

Figure 1:
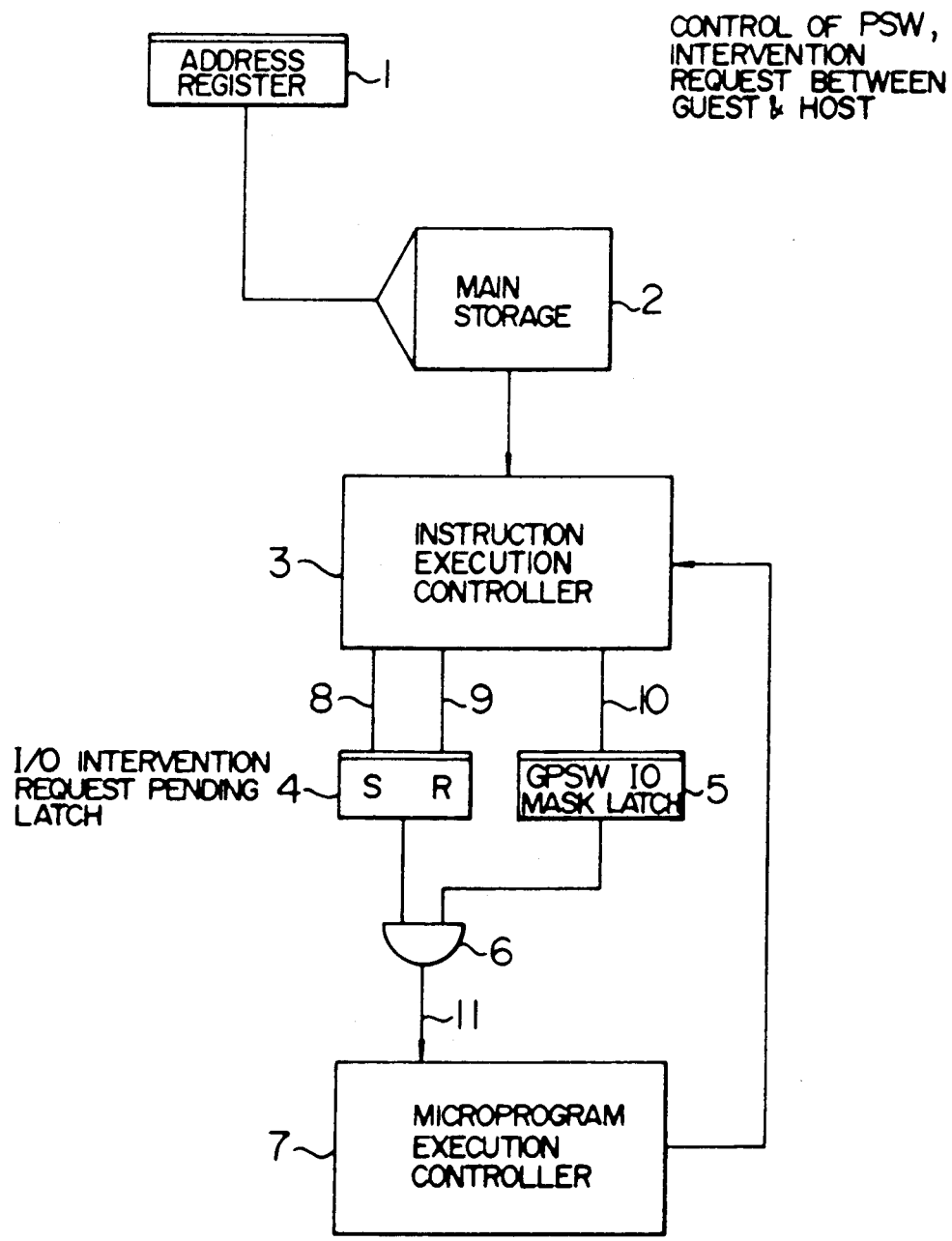
FIG. 1 is a block diagram showing an embodiment of a control system according to the present invention.
Figure 2:
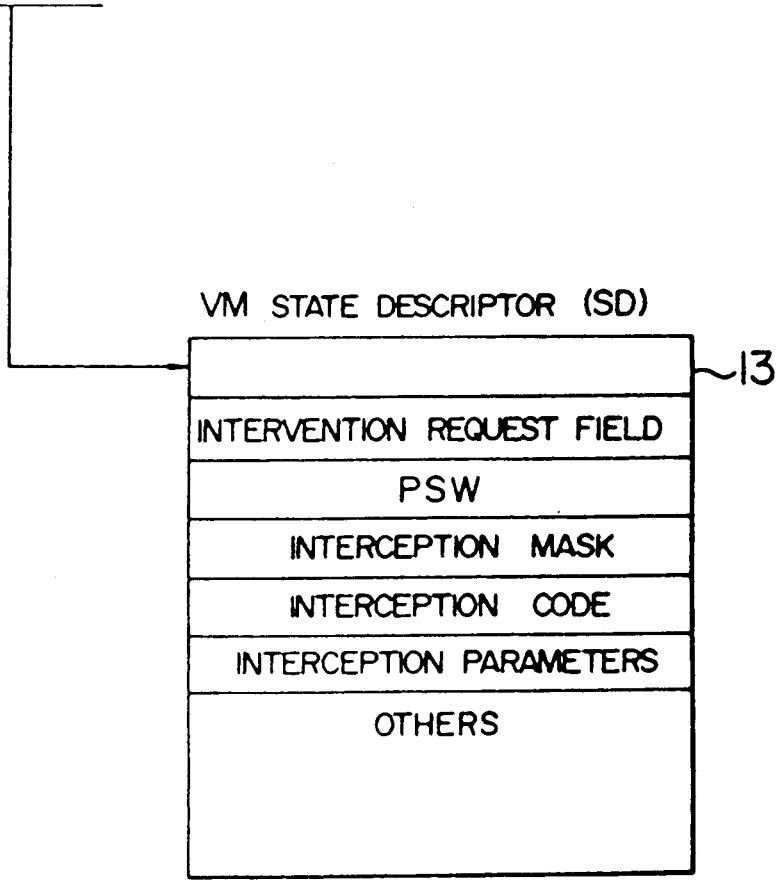
FIG. 2 shows the format of a start interpretative execution (SIE) instruction for starting the execution of a virtual machine.

FIG. 1 shows the arrangement of the control system of this invention. In the Figure, reference numeral 1 denotes an address register, 2 a main storage, and 3 an instruction execution controller. Reference numeral 4 denotes an I/O intervention request pending latch, 5 a guest PSWIO mask latch, and 6 an AND gate for obtaining a logical product of the I/O intervention request latch 4 and the guest PSWIO mask latch 5. The elements 4 to 6 are used for a guest I/O interruption. Used for a guest external interruption are similar elements which are omitted in this embodiment. The instruction execution controller 3 causes the I/O intervention request pending latch 4 to set via a control line 8 and reset via a control line 9 to thereby renew the data stored in the latch 4. An output from the AND gate 6 serves as an interruption trigger 11 which notifies a microprogram execution controller 7 of an interruption of the microprogram.

Figure 3:
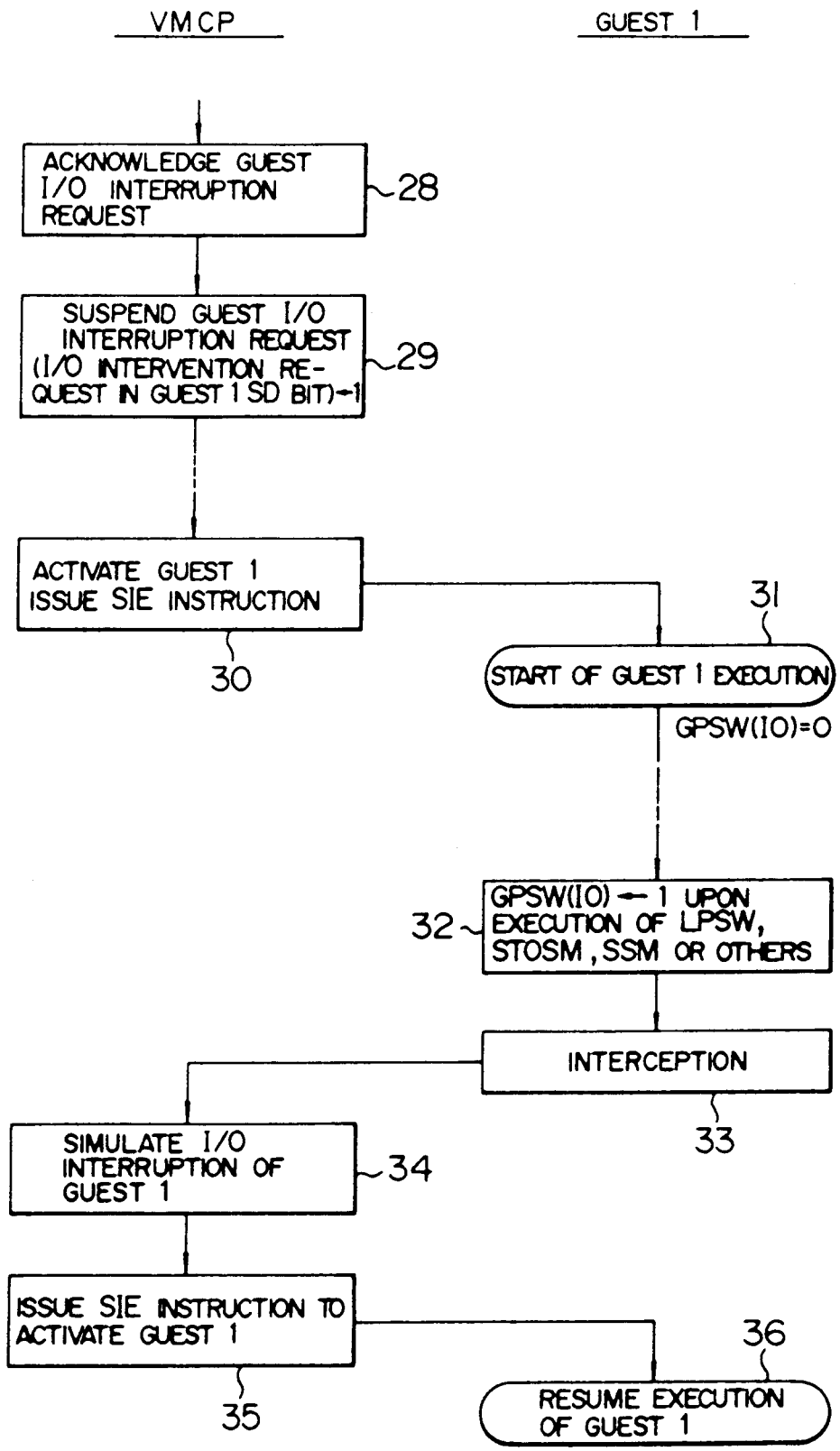
FIG. 3 shows a flow chart illustrating the case where the VMCP suspends a guest interruption.
Figure 4:
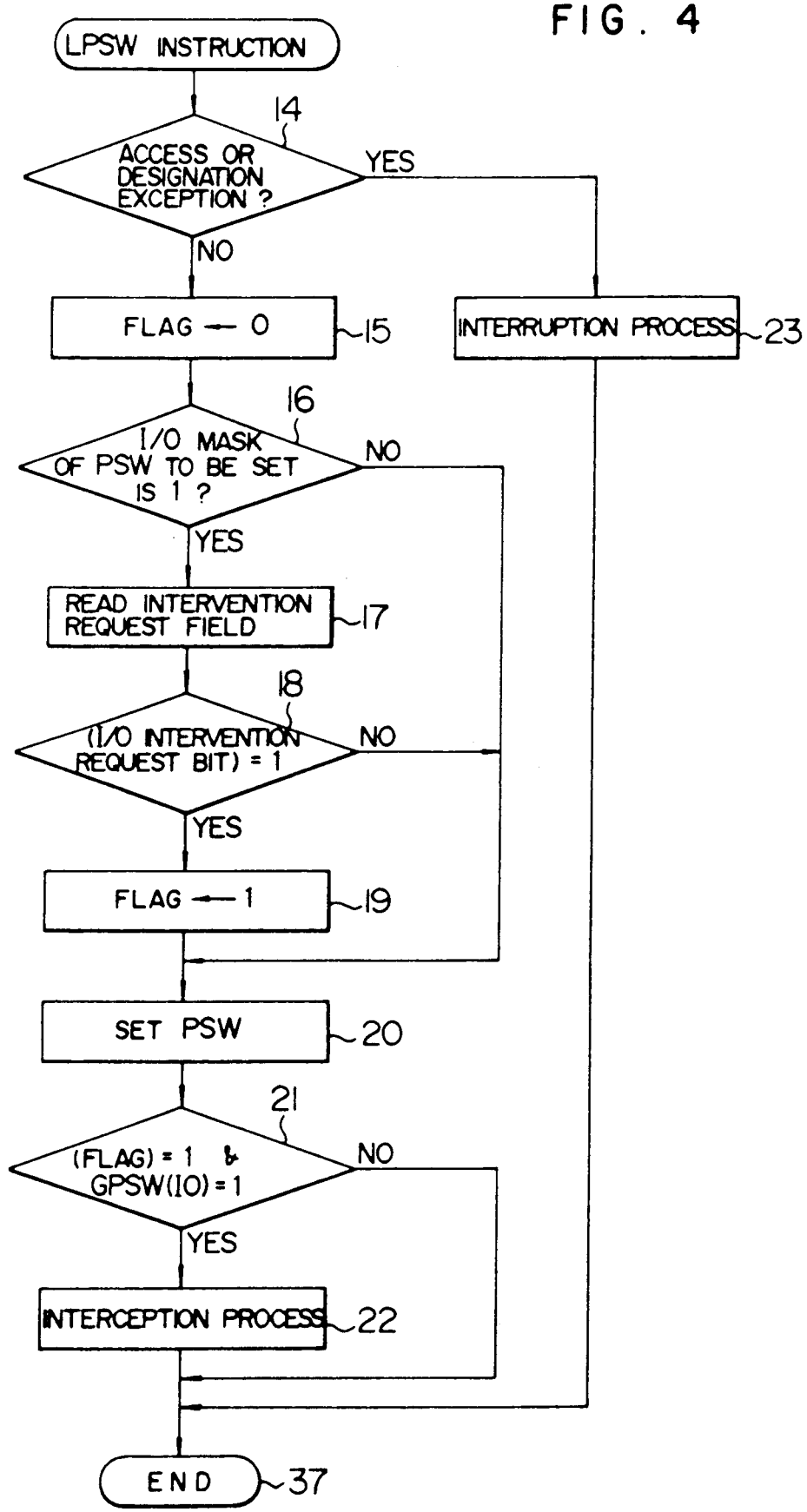
FIG. 4 is a flow chart showing the processing of an LPSW instruction.

The operation of the control system shown in FIG. 1 will be described with reference to FIG. 3. An SIE instruction is issued at step 30 to activate the guest 1. In processing the SIE instruction, an address designated by the B2 and D2 fields of the SIE instruction is set at the address register 1 to read the SD from the main storage 3. Of the read-out SD, the I/O intervention request bit and the guest PSWIO mask are set at the I/O intervention request pending latch 4 and the guest PSWIO mask latch 5, respectively, via the instruction execution controller 3. The I/O intervention pending latch 4 is renewed at a proper period during executing the guest VM, by reading the SD on the main storage 3. This renewal is carried out in order to reflect an I/O intervention request acknowledged and suspended by another CPU in a multi-processor system while the guest 1 is executing its own I/O intervention request. On the other hand, the guest PSWIO mask latch 5 is renewed upon execution of an instruction which changes the guest mask, the instruction including such as an LPSW instruction, STOSM instruction, STNSM instruction, SSM instruction and the like.

If the I/O intervention request pending latch 4 is "1" and the guest PSWIO mask latch 5 is on, then the AND gate 6 outputs an interruption trigger 11 of "1" to notify the microprogram execution controller 7 of an interruption. In more particular, if the VMCP is suspending the guest I/O interruption, the I/O intervention request pending latch 4 becomes "1" so that the guest VM runs while the guest PSWIO mask latch 5 is on. However, immediately after the guest PSW IO mask becomes on (step 32) upon execution of an instruction which changes the guest system mask, the interruption trigger 11 becomes on to terminate the execution of the guest VM at the interception process (step 33) by means of the interruption to the microprogram. If the execution of the guest VM terminates due to other causes, the I/O intervention request pending latch 4 is reset after the termination.

Figure 5:
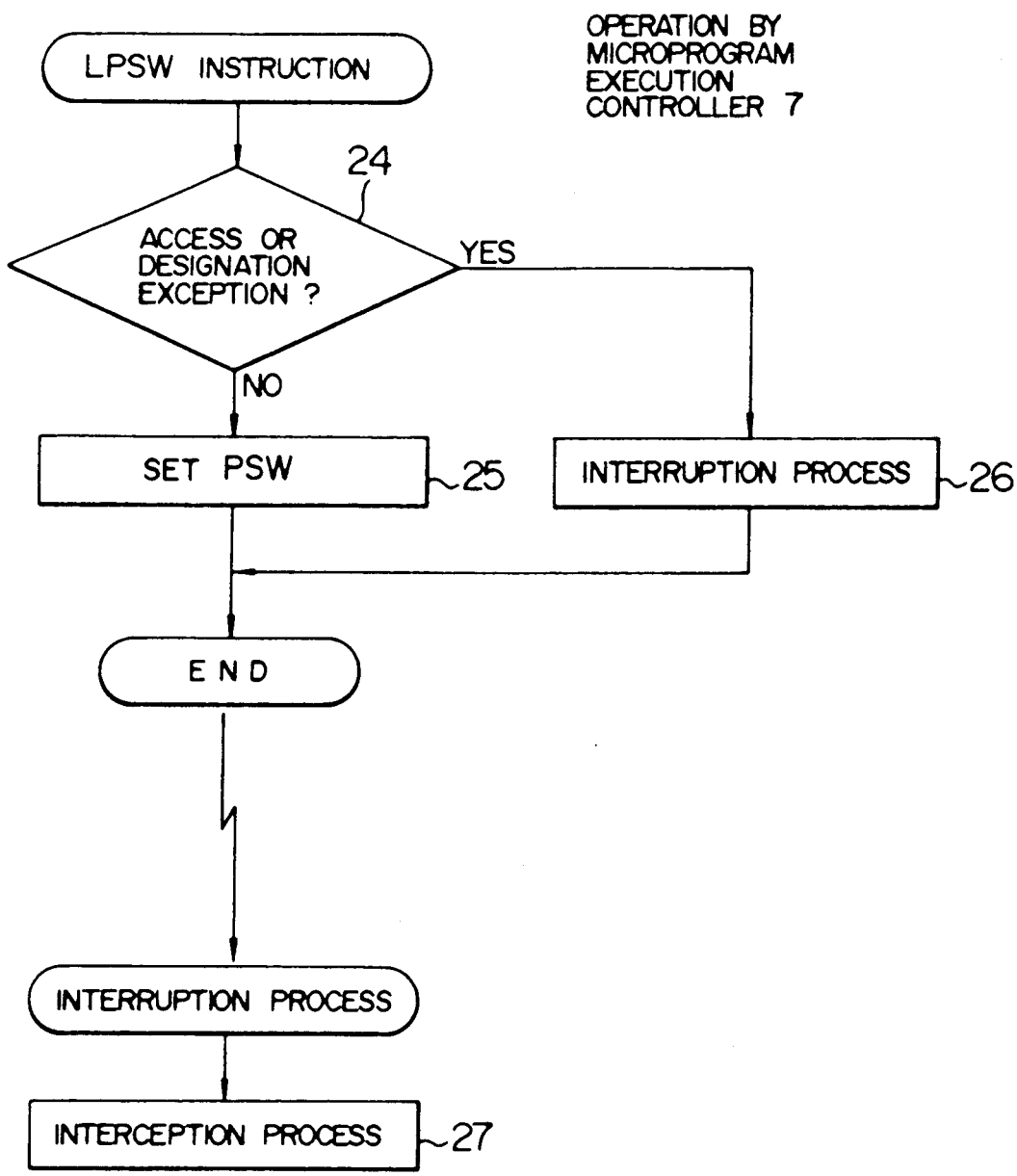
FIG. 5 is a flow chart showing the processing of an LPSW instruction according to the present invention.

Since the condition of an interception to be caused by the guest interruption suspended by the VMCP is checked during the execution of the guest VM, the condition needs not be checked by the microprogram when a control instruction of the guest VM is to be executed. This operation will then be described with reference to FIG. 5 which shows the processing of an instruction which changes a system mask of the guest PSW, by using an LPSW by way of example. An access exception and a designation exception are checked at step 24. If there is no cause of exception, the PSW is set at step 25 to thereafter terminate executing the instruction. This eliminates the overhead of processing the guest instruction as discussed previously. On the other hand, if there is any cause of exception, an interruption process is performed (step 26). If the interception condition is met after the I/O intervention request, then the microprogram issues an interruption as discussed previously to perform an interception process (step 27).

We claim:

1. A virtual machine system comprising:
   (a) a main storage for storing a state descriptor for a guest virtual machine;
   (b) an instruction execution unit, connected to said main storage, for starting execution of the guest virtual machine such that in executing an instruction for starting the execution of the virtual machine, said state descriptor for the guest virtual machine on the main storage at the location designated by the instruction is stored in a hardware resource, wherein said state descriptor includes information for indicating whether the execution of the guest virtual machine is to be terminated;
   (c) first means, included in said hardware resource and connected to said instruction execution unit, for storing said information, included in said state descriptor of the guest virtual machine, indicating whether the execution of the guest virtual machine is to be terminated;
   (d) second means, connected between said instruction execution unit and said first means, for setting and resetting said information stored in said first means according to said state descriptor in response to execution of an instruction for starting the execution of the guest virtual machine;
   (e) third means, included in said hardware resource and connected to said instruction execution unit, for holding mask data as the state of the guest virtual machine, said mask data representing whether said guest virtual machine can accept an interruption, said third means being initialized by execution of said start instruction and renewed upon execution of an instruction which changes mask data; and
   (f) fourth means, connected to said first means and said third means, for suspending executions performed by a guest virtual machine and completing the execution of said instruction for starting the execution of the guest virtual machine in response to a predetermined relation between outputs from said first and third means.

2. A virtual machine system according to claim 1, wherein said first means comprises a flag latch circuit for storing a flag the content of which is sent to the guest virtual machine to request an intervention to the guest virtual machine, and said instruction execution unit sets and resets the flag in said latch circuit via said second means.

3. A virtual machine system according to claim 1, wherein said third means is a mask latch circuit for holding mask data as mask state of the guest virtual machine which is used for selective permission of operation interruptions of the guest virtual machine.

4. A virtual machine system according to claim 1, wherein said fourth means comprises a logical gate circuit for performing an AND operation of the outputs from said flag latch circuit and said mask latch circuit.

5. In a virtual machine system for running a plurality of guest virtual machines under control of a host machine, a control circuit for controlling state transition from a guest virtual machine to a host machine in accordance with a guest virtual machine state descriptor and mask data for selectively masking a plurality of interruptions for intercepting execution of the guest virtual machine, said guest virtual machine state descriptor and said mask data being respectively set in a hardware resource in response to execution of a start instruction for starting the execution of the guest virtual machine, said control circuit comprising:
   (a) a logical product circuit for obtaining a logical product of at least two inputs;
   (b) a mask latch circuit, included in said hardware resource and connected to one of said at least two inputs, for storing said mask data in response to execution of said start instruction and in response to performance of an execution by said guest virtual machine;
   (c) an intervention request flag latch circuit included in said hardware resource and connected to another of said at least two inputs, for holding, in response to execution of said start instruction, a flag representative of an execution intervention to the guest virtual machine taken from an intervention request field contained in said guest virtual machine state descriptor; and
   (e) an instruction execution unit for performing an intercepting operation which changes the state of the machine from a guest virtual machine to a host machine in accordance with an output from said logical product circuit.

6. A control circuit according to claim 5, wherein said instruction execution unit comprises means for setting a PSW in response to an instruction which changes mask data in said system mask of the hardware resource of the guest virtual machine, and interception means for performing an intercepting operation which changes the state of the machine from the guest virtual machine to the host machine by means of an interruption.

7. A control circuit according to claim 6 comprising means for setting and resetting the mask data in said mask latch circuit in response to any one of instructions executed by said guest virtual machine, said instructions including a load PSW instruction, a Store-Then-OR-System-Mask instruction, a Store-Then-AND-System-Mask instruction and a Set-System-Mask instruction.

8. A control circuit according to claim 7 wherein said start instruction is a start interpretive execution instruction supplied from the host machine, said instruction having a base register number and a displacement.

* * * * *